US011810035B2

(12) United States Patent
Jha et al.

(10) Patent No.: US 11,810,035 B2
(45) Date of Patent: Nov. 7, 2023

(54) SYSTEMS AND METHODS FOR EXPANDING DATABASE CAPABILITIES

(71) Applicant: SAP SE, Walldorf (DE)

(72) Inventors: Rajeev Kumar Jha, Bangalore (IN); Prashant Priyadarshi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/488,988

(22) Filed: Sep. 29, 2021

(65) Prior Publication Data
US 2023/0099004 A1 Mar. 30, 2023

(51) Int. Cl.
*G06Q 10/06* (2023.01)
*G06Q 10/0631* (2023.01)

(52) U.S. Cl.
CPC .............. *G06Q 10/06313* (2013.01)

(58) Field of Classification Search
None
See application file for complete search history.

(56) References Cited

U.S. PATENT DOCUMENTS

| 8,204,809 | B1* | 6/2012 | Wise | G06Q 40/06 |
| | | | | 705/36 R |
| 2008/0059383 | A1* | 3/2008 | Mayernik | G06Q 10/04 |
| | | | | 705/2 |
| 2008/0195579 | A1* | 8/2008 | Kennis | G06Q 10/06393 |

FOREIGN PATENT DOCUMENTS

| CA | 2639716 A1 | 3/2009 |
| CN | 102122416 A | 7/2011 |
| JP | 2005189985 A | 7/2005 |
| JP | 2019028711 A | 2/2019 |
| MX | PA03009233 A | 11/2004 |

OTHER PUBLICATIONS

Baidya et al. (Sustainable Waste Transportation in Kolkata Using DBMS and Image Sensing, In: Ghosh, S. (eds) Waste Management as Economic Industry Towards Circular Economy, pp. 129-136. Springer, Singapore, https://doi.org/10.1007/978-981-15-1620-7_13, 2020).*

"Enterprise Management Systems (ERP)", Wastedge.com, [Online]. Retrieved from the Internet: <URL: https://www.wastedge.com/solutions/enterprise-management/>, (Accessed Aug. 11, 2021), 4 pgs.

"Top 9 Waste Management Software in 2021", Predictive Analytics Today, [Online]. Retrieved from the Internet: <URL: https://www.predictiveanalyticstoday.com/top-waste-management-software/>, (Accessed Aug. 11, 2021), 17 pgs.

(Continued)

*Primary Examiner* — Matthew D Henry
(74) *Attorney, Agent, or Firm* — SCHWEGMAN LUNDBERG & WOESSNER, P.A.

(57) ABSTRACT

Various examples are directed to systems and methods for executing an enterprise resource planning solution using a database management system (DBMS). An order-to-cash process executing at the at least one processor accesses an indication of waste material for disposal and generates a waste disposal order, where the waste disposal order comprises a material description field including a description of the waste material, regulatory reporting data describing at least one report of the waste material to be provided to a regulatory agency, and a price field indicating a negative price.

20 Claims, 8 Drawing Sheets

(56) References Cited

OTHER PUBLICATIONS

"Waste Management (EHS-WA)", [Online]. Retrieved from the Internet: <URL: https://help.sap.com/viewer/8a399f5444164440ac4f426e847ec901/6.18.11/en-US/7567bd534f22b44ce10000000a174cb4.html>, (Accessed Aug. 11, 2021), 6 pgs.

"Waste Management Software", SourceForge, [Online]. Retrieved from the Internet: <URL: https://sourceforge.net/software/waste-management>, (Accessed Aug. 11, 2021), 20 pgs.

"Waste Transfer Stations: A Manual for Decision-Making", United States Environmental Protection Agency. EPA530-R-02-002, [Online]. Retrieved from the Internet: <URL: www.epa.gov/sites/default/files/2016-03/documents/r02002.pdf>, (Jun. 2002), 66 pgs.

\* cited by examiner

SYSTEMS AND METHODS FOR EXPANDING DATABASE CAPABILITIES

BACKGROUND

Databases are used in many different computer processing environments to store data, often in a structured and easily-accessible way. Many databases are managed by database management systems that execute database operations received from users.

BRIEF DESCRIPTION OF DRAWINGS

The present disclosure is illustrated by way of example and not limitation in the following figures.

DETAILED DESCRIPTION

Figure 1:
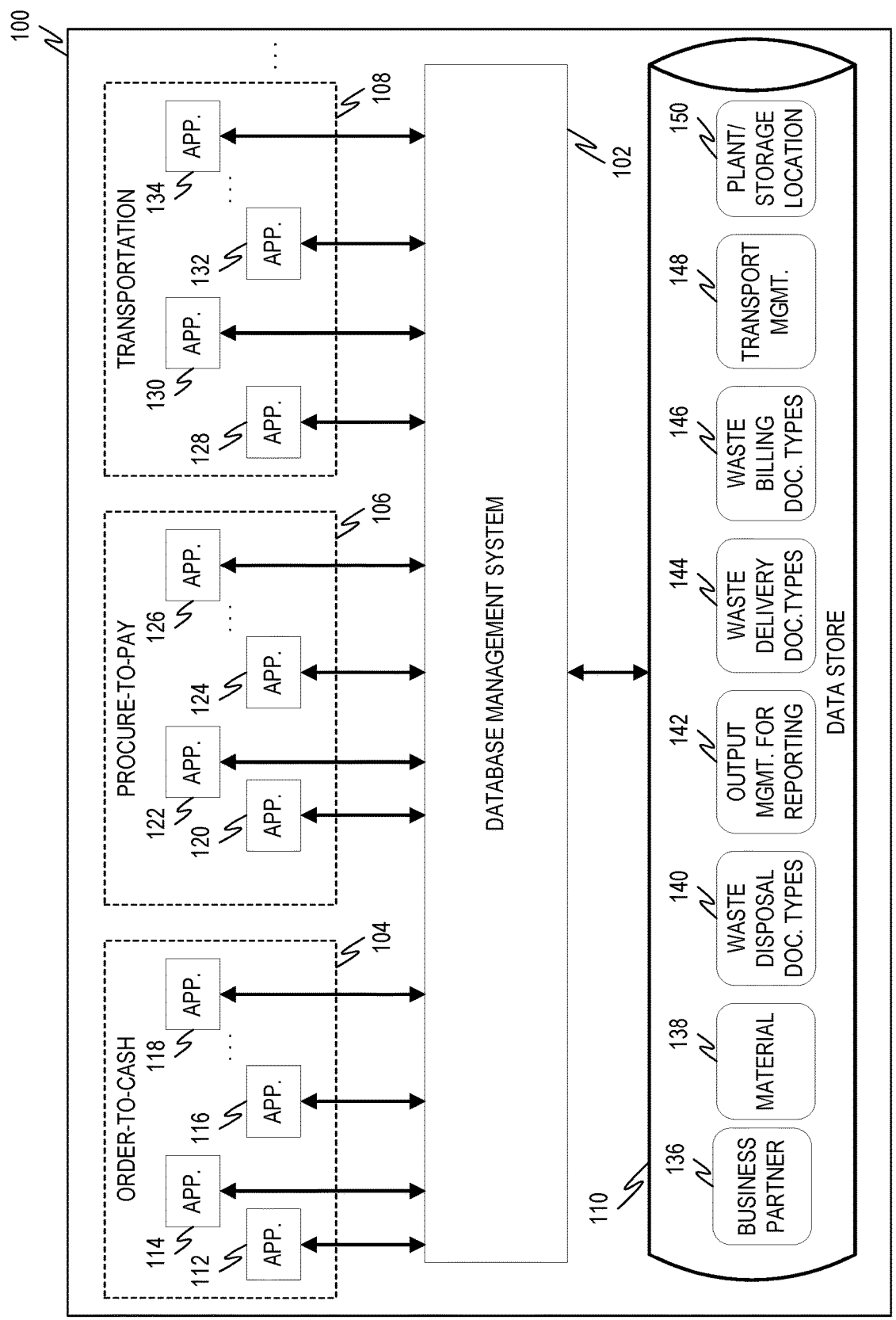
FIG. 1 is a diagram showing one example of an environment including a database management system (DBMS) and enterprise resource planning (ERP) client processes.

A DBMS can be executed as part of a suite of software applications that execute together. For example, the DBMS may support various client processes that utilize the DBMS to manage data. In some examples, a DBMS is implemented with a suite of applications that implement an ERP software solution. ERP solutions are often used in conjunction with a DBMS to manage various different aspects of business operations.

The ERP solution generates and utilizes the data stored at the database management system to perform different business tasks. For example, an ERP solution supporting a human resources operation may store employee records at the DBMS. An ERP solution supporting accounting may use records managed by the DBMS to perform various accounting-related tasks such as generating and recording invoices, purchase orders, and the like. An ERP solution supporting human resources management may perform various tasks related to, for example, using data managed by the DBMS to generate and manage payroll, benefits, and the like. Other ERP solutions may perform other business tasks.

An ERP solution may comprise a set of client processes. A client process is an application or set of applications that execute to perform a particular task. Consider an example accounting ERP solution. The accounting ERP solution may include an order-to-cash process and a procure-to-pay process. The order-to-cash process may comprise an application or set of applications for processing an order for goods and/or services from the receipt of the order through the receipt of compensation from the purchaser. The order-to-cash process may include one or more applications configured for processing incoming purchase orders, generating instructions for delivering goods or services to fulfill the orders, generating invoices for payment, managing accounts payable, and the like.

A procure-to-pay client process may comprise an application or set of applications for managing the procurement of goods and/or service from purchase order generation through payment for the goods and/or services. The procure-to-pay process may include one or more applications configured for selecting vendors, generating purchase orders, processing vendor invoices, and executing payment for goods and services.

In various examples, adding functionality to an ERP solution involves adding additional client processes. Consider an example in which an enterprise uses an ERP solution focused on accounting. The ERP solution may comprise an order-to-cash client process and a procure-to-pay client process. If the enterprise also wishes to use the ERP solution to manage human resources, it may need to execute additional client processes to perform human resource related tasks such as, for example, managing payroll, benefits, and the like. Licensing, installing, and executing additional client processes can incur additional expense and consume additional computing resources. For example, the entity may need to purchase a license to the new client processes and may need to purchase on-premises or virtual infrastructure to execute the new client processes.

Because of the disadvantages of adding new client processes to an ERP solution, it can be desirable in some situations to add new functionality to an ERP solution without adding new client processes. Consider the example of waste management. Various enterprises generate waste during business activities, ranging from ordinary garbage to biproducts of industrial work. A waste removal transaction may involve arranging for a disposer party to receive the waste material, reporting waste generation and/or removal to a relevant regulatory agency, and, in some examples, handling a payment to or from the waste receiver.

There are certain aspects of waste removal transactions that make them unsuitable for processing with standard accounting ERP solutions and associated client processes. For example, standard accounting client processes, such as procure-to-pay and order-to-cash processes, may not be configured to handle regulatory reporting to environmental agencies. Also, in certain respects, a waste removal transaction is backwards relative to standard purchases and sales. For example, in a waste removal transaction, material generated by an enterprise is transferred to another party (i.e., the disposer party). This transfer does not look like a standard sale, however, due to the regulatory reporting requirements and the fact that the disposer party very often charges a fee instead of paying one.

There are various environmental management client processes that can be executed in conjunction with DBMS and ERP solutions to manage waste disposal activities. These solutions, however, suffer from the same disadvantages of adding new ERP client processes described herein. These include, for example, the need to license additional client processes and the need to provide additional computing system infrastructure to execute the new processes. For many entities, expending the financial and computing system resources necessary to run a full environmental ERP solution is inefficient and even wasteful.

Various examples, however, are directed to avoiding potential computing system inefficiencies of a full environmental ERP solution by implementing waste disposal management by re-using and/or repurposing order-to-cash and/or procure-to-pay processes and associated applications. For example, the order-to-cash process may be modified to generate a waste disposal transaction described by a waste disposal order. The order-to-cash process may be modified to generate the waste disposal order. The waste disposal order may be similar to a standard order for goods and/or services generated by the order-to-cash process in that it describes a transaction in which material is transferred from the implementing entity to a business partner. In this way, the waste disposal order, once generated, may be used by the various applications of the order-to-cash process to initiate actions to cause the waste to be provided to the business partner.

To account for the fact that many waste disposal transactions involve a payment to the business partner rather than a payment from the business partner, the waste disposal order may be arranged with a negative price. The order-to-cash process may be called, as described herein, to initiate one or more transactions to settle the negative price with the business partner. As described herein, this may allow the waste disposal order to be generated by an order-to-cash application that is otherwise arranged to generate sales orders or other similar documents.

In some examples, the waste disposal order also includes fields for handling reporting of waste disposal actions to relevant regulatory authorities. For example, the waste disposal order may be modified relative to a standard order for goods and services such that the waste disposal order includes a waste material description field for including waste material data, such as a waste code, describing the relevant waste material. Further, the waste disposal order may be modified to include an indication of the regulatory body to which the waste disposal transaction is to be reported and may prompt a reporting action to initiate a regulatory report. In this way, an entity may process waste disposal transactions by modifying and repurposing existing applications without the need to license or code additional applications and utilize additional computing system resources.

FIG. 1 is a diagram showing one example of an environment 100 including a DBMS 102 and ERP client processes 104, 106, 108. The ERP client processes include an order-to-cash process 104, a procure-to-pay process 106, and an optional transportation process 108. The client processes 104, 106, 108 include a set of one or more applications. For example, the order-to-cash process 104 includes applications 112, 114, 116, 118 and so on. The procure-to-pay process 106 includes applications 120, 122, 124, 126 and so on. The transportation process 108 includes applications 128, 130, 132, 134 and so on.

The various client processes 104, 106, 108 and constituent applications 112, 114, 116, 118, 120, 122, 124, 126, 128, 130, 132, 134 are in communication with a DBMS 102 that manages data at a data store 110. The data store 110 includes various data structures for supporting the ERP client processes 104, 106, 108. The various data structures may include records describing various elements used by the ERP client processes 104, 106, 108. Example record types used for a waste disposal transaction may include business partner records 136, waste material records 138, waste disposal document type records 140, output management records 142, waste delivery document type records 144, waste billing document type records 146, transportation management records 148, and plant/storage location records 150.

The environment 100 may be implemented in various different computing system arrangements and according to different architectures. In some examples, the environment 100 is implemented using an on-premises arrangement. In an on-premises arrangement, the DBMS 102 and client processes 104, 106, 108 execute at an on-premises computing system that is built and maintained by an enterprise at the enterprise's own site or premises. Users associated with the entity access the DBMS 102 and client processes 104, 106, 108 via the on-premises computing system.

In other examples, the environment 100 is implemented according to a private cloud arrangement. In a private cloud arrangement, the entity implementing the environment 100 acquires remote cloud computing system resources and executes the DBMS 102 and client processes 104, 106, 108 at the remote cloud computing system, for example, according to a Platform-as-a-Service (PaaS) model. Users associated with the entity access the DBMS and processes 104, 106, 108 by accessing the private cloud system.

In still other examples, the environment 100 can be implemented in a public cloud arrangement. In a public cloud arrangement, the DBMS 102 and client processes 104, 106, 108 are executed and maintained by a service provider at a cloud environment maintained by the service provider. The entity using the DBMS 102 and client processes 104, 106, 108 purchases access to the software, for example, according to a Software-as-a-Service (SaaS) model. Instances of the DBMS 102 and client processes 104, 106, 108 are executed at the public cloud arrangement. Different instances may be associated with different tenant entities such that the provider may support the uses of more than one entity from the same public cloud environment.

The DBMS 102, client processes 104, 106, 108 and constituent applications 112, 114, 116, 118, 120, 122, 124, 126, 128, 130, 132, 134 may also be implemented in various different ways. In some examples, the DBMS 102, client processes 104, 106, 108 and constituent applications 112, 114, 116, 118, 120, 122, 124, 126, 128, 130, 132, 134 are implemented as executables, libraries, and so forth implemented on a common system, such as an on-premises computing system or private cloud. In other examples, some or all of the DBMS 102, client processes 104, 106, 108 and constituent applications 112, 114, 116, 118, 120, 122, 124, 126, 128, 130, 132, 134 are implemented according to a microservices architecture. According to a microservices architecture, the DBMS 102, client processes 104, 106, 108 and constituent applications 112, 114, 116, 118, 120, 122, 124, 126, 128, 130, 132, 134 may be implemented by various microservices executing within a container. A microservice architecture may be used, for example, in an on-premises implementation but also in a public cloud arrangement.

In some arrangements, the client processes 104, 106, 108 are arranged to perform various workflows. Executing a workflow may involve generating one or more documents, modifying one or more documents, and/or prompting one or more actions. Consider an example sales contract workflow performed by the order-to-cash process 104. Executing the sales contract workflow may include, for example, prompting a user or other party to provide information related to the sales contract, generating a sales contract document, and prompting delivery of goods or services conveyed by the sales contract to the purchasing party. Consider another sales quotation workflow performed by the order-to-cash process 104. Executing the sales quotation workflow may include retrieving a description of the goods and/or services that are the subject of the sales quotation, generating a quotation document, and providing the quotation document to the relevant business partner. Consider another example credit memo request workflow that may be performed by the order-to-cash process 104. The credit memo request workflow may determine a liability, generate and store a credit memo or other document describing the liability, and direct a payment or payments to the holder of the liability.

In some examples, the various client processes 104, 106, 108 implement a workflow using one or more of the applications 112, 114, 116, 118, 120, 122, 124, 126, 128, 130, 132, 134. For example, in one arrangement, the application 112 of the order-to-cash process 104 implements a sales contract workflow for generating sales contract data, application 114 implements a sales quotation workflow, and so on. Similarly, in some examples, application 120 of the procure-to-pay process 106 may implement an incoming invoice settlement workflow, application 128 of the transportation process 108 may implement a freight handling workflow, and so on.

The order-to-cash, procure-to-pay, and (optionally) transportation processes 104, 106, 108 may be modified, as described herein to implement a waste disposal function, for example, using the existing client processes 104, 106, 108 and without the need to code, purchase, or install a new client process. This may be accomplished by re-using and/or re-purposing workflows already implemented by the various client processes 104, 106, 108, for example, by repurposing one or more of the applications 112, 114, 116, 118, 120, 122, 124, 126, 128, 130, 132, 134. In some examples, one or more applications 112, 114, 116, 118 of the order-to-cash process 104 may be modified to generate a waste disposal order that differs from other orders associated with customer orders, for example, in that it may include a negative price and may include data about the waste material and regulatory agency data describing the regulatory agency to which the waste disposal is to be reported.

As described herein, the DBMS 102 manages the storage of various data structures associated with the order-to-cash and procure-to-pay processes 104, 106 at the data store 110. The data structures may include, for example, database tables, sets of database tables, portions of database tables, and so forth. Data structures stored at the data store 110 may include various different kinds of records used and/or consumed by the ERP client processes 104, 106, 108, including example records 136, 138, 140, 142, 144, 146 148, 150 for waste disposal transactions as described herein.

A business partner record 136 describes a business partner of the entity using the environment 100. Business partners may include customers and vendors, for example, as used by the order-to-cash process 104 and procure-to-pay process 106 for standard accounting tasks such as managing purchase orders and orders for goods and/or services to be provided by the entity. Some business partner records 136 may describe potential disposer parties. Disposer parties are parties who will receive waste material disposed in a waste disposal transaction. The disposer party, in some examples, acts as a buyer, for example, by paying the disposing entity for the waste material. In other examples, the disposer party charges a fee for disposing the waste material. The business partner record 136 may be stored to and retrieved from a business partner table or other business partner data structure stored at the data store 110 and managed by the DBMS 102.

A material record 138 describes a material used in the ordinary business of the implementing entity. For example, material records may describe raw materials, intermediate manufactured materials, stock materials, and so forth. In this example, the procure-to-pay process 106 and/or order-to-cash process 104 may use material records 138 to describe waste materials for disposal. In some examples, a material record 138 may include a record field indicating a waste code and/or a record field indicating one or more regulatory agencies to which disposal should be reported. In this way, material records 138 may be used to describe waste materials, thereby facilitating waste disposal transactions as described herein. A material record 138 may be stored to and retrieved from a material data structure.

A waste disposal document type record 140 may describe a document used by the various ERP client processes 104, 106, 108 to manage waste disposal transactions. For example, waste disposal document type records 140 may be stored at a document type record table or other data structure including records describing other documents used by the ERP client processes 104, 106, 108, such as contracts, quotations, orders, credit requests, invoices, purchase orders, and the like. Waste disposal document type records 140 may indicate documents that are used by the ERP client processes 104, 106, 108 to facilitate waste disposal transactions. Example documents that may be described by waste disposal document type records 140 include waste disposal orders and other documents as described herein with respect to FIGS. 2 and 3.

An output management record 142 may describe waste disposal disclosures to be made to a relevant regulatory agency. For example, an output management reporting record may include fields identifying the relevant regulatory agency and, in some examples, an output management reporting record 142 may also include data describing the type of information to be submitted to the regulatory agency and/or other data about a required reporting. An output management record 142 may also include, for example, a transportation manifest, as described herein.

A waste delivery document type record 144 may describe documents used by the various ERP client processes 104, 106, 108 to arrange deliveries of waste material to disposer parties. In some examples, waste delivery document type records 144 may be stored at a document type table or other data structure that includes other document type records, such as waste disposal document type records 140 and waste billing document type records 146. Examples of waste delivery document types that may be described by waste delivery document types include waste disposal shipment documents, waste disposal delivery documents for outbound deliveries, and the like.

A waste billing document type record 146 may include documents used by the various ERP client processes 104, 106, 108 to arrange billings associated with waste delivery. In some examples, billing document type records 146 may be stored at a document type table or other data structure that includes other document type records, such as waste disposal document type records 140 and waste delivery document type records 144. Examples of waste billing documents may include waste disposal invoices, waste disposal credit memos, and the like.

A transportation management record 148 may include fields describing transportation arranged for a lot or other unit of waste material that is the subject of a waste disposal transaction. In some examples, a transportation management record 148 may be used to describe other transportation or delivery transactions arranged using the ERP client processes 104, 106, 108 such as, for example, to deliver a product to a customer. For example, a transportation or delivery transaction may include utilizing a delivery vehicle of the entity generating the waste to deliver the waste material to the disposer party and/or contracting with a delivery or transportation service to pick up the waste material and provide it to the waste disposer. Examples of document types that may be described by transportation management records include waste disposal freight orders, freight settlement documents, and the like.

A plant/storage location record 150 describes a location where waste material may be stored until a disposal transaction is executed. A plant storage location record 150 may also describe inventory locations used to store other stock, for example, for use in manufacturing and/or goods for sale.

Figure 2:
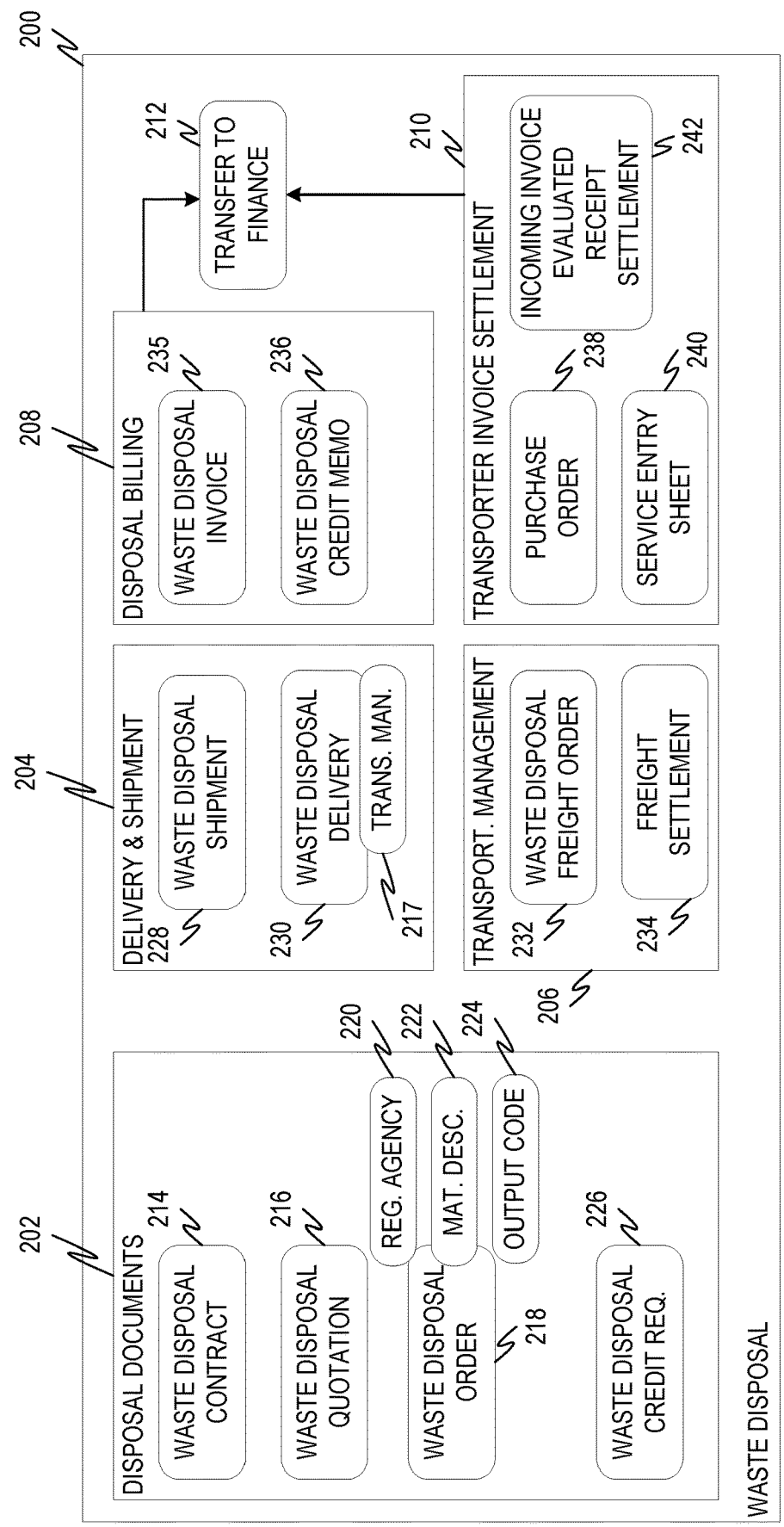
FIG. 2 is a diagram including a waste disposal arrangement illustrating one example method for managing a waste disposal transaction using an order-to-cash process, procure-to-pay process, and/or transportation process.

FIG. 2 is a diagram including a waste disposal arrangement 200 illustrating one example method for managing a waste disposal transaction using the order-to-cash process 104, procure-to-pay process 106, and/or transportation process 108. The arrangement 200 indicates disposal documents 202 that may be generated by the order-to-cash process 104. The order-to-cash process 104 may be configured to generate a waste disposal contract 214, for example, based on terms entered by a user, received from the disposer party, and/or generated by the order-to-cash process 104. The waste disposal contract 214 may indicate, for example, a quantity of waste material to be disposed, a disposer party, a price for the disposal, whether that price will be paid to the disposer party or received from the disposer party, and the like. The order-to-cash process 104 may generate the waste disposal contract using a sales contract workflow implemented by one or more of the applications 112, 114, 116, 118.

The order-to-cash process 104 may also be configured to generate a waste disposal quotation 216. The waste disposal quotation 216 may indicate a quotation for waste removal received from a disposer party. Terms of the quotation may be provided by a user, received from a disposer party, and/or generated by the order-to-cash process 104. The waste disposal quotation 216 may indicate, for example, a quantity of waste material to be disposed, a disposer party, a price for the disposal, whether that price will be paid to the disposer party or received from the disposer party, and the like. The order-to-cash process 104 may generate the waste disposal quotation using a sales quotation workflow implemented by one or more of the applications 112, 114, 116, 118.

Based on a waste disposal contract 214 and/or a waste disposal quotation 216, the order-to-cash process 104 may generate a waste disposal order 218. The waste disposal order 218 may be generated by a sales order workflow of the order-to-cash process 104 and, accordingly, the waste disposal order 218 may be similar to other sales orders generated by a sales order workflow. For example, the waste disposal order 218 may comprise a material field describing the waste material. The waste disposal order 218 may include a business partner field that, in a sales order, would indicate a purchasing party. In this example, the business partner field may indicate the disposer party. For example, the order-to-cash process 104 may query the DBMS to retrieve a business partner record indicating the disposer party.

Like a standard sales order, the waste disposal order 218 may also include a price field. In a standard sales order, the price field would indicate the price that the purchase will pay for the goods or services provided. In this example, however, the disposer party may require payment in order to take delivery of the waste material. The waste disposal order 218 may accordingly be modified to permit the price field to accept a negative price. In examples where the disposer party charges a fee for disposing of the waste material, the waste disposal order 218 may indicate the fee as a negative price at the price field.

The waste disposal order 218, in some examples, may also include additional fields that may be included in a standard sales order such as, for example, a regulatory agency field 220, a material description field 222, and an output field 224. The regulatory agency field 220 may list one or more regulatory agencies to which the waste disposal transaction is to be reported. The material description field 222 may include a description of the waste material, such as one or more waste codes associated with the waste material. For example, the waste codes may describe the waste material and may be reported to the regulatory agency or agencies indicated at the regulatory agency field 220. The output field 224 may describe an action for reporting the waste material to the regulatory agency. For example, output field 224 may include data describing when the waste disposal transaction described by the waste disposal order is to be reported, what information is to be reported, and the like.

The waste disposal order 218 may be generated, for example, according to a sales order workflow of the order-to-cash process 104, with the sales order workflow implemented by one or more of the applications 112, 114, 116, 118. In some examples, the existing sales order workflow may be modified to add fields 220, 222, 224 to the waste disposal order 218. The existing sales order workflow, in some examples, may also be modified to respond to a negative price at the price field by calling a credit memo request workflow of the order-to-cash process 104 to generate and satisfy a credit memo to affect payment of the negative price to the disposer party. In this way, the environment 100 may implement a waste disposal transaction using the existing client processes 104, 106, 108 and applications 112, 114, 116, 118, 120, 122, 124, 126, 128, 130, 132, 134 and may not require a new client process, such as a complete environmental management process.

A waste disposal credit request 226 may be generated, for example, by a request workflow of the order-to-cash process 104 executed by one or more of the applications 112, 114, 116, 118. For example, the workflow may access the waste disposal order 218 to retrieve information about the waste disposal transaction including, for example, a negative price indicated by the waste disposal order 218. In some examples, a waste disposal credit request 226 can be created for waste disposal transactions where a negative price or added item with negative price is not appropriate. For example, in a transaction in which the disposer party purchase the waste, an invoice for the price of the waste may be provided to the disposer party. In some examples, a waste disposal credit request 226 may also be generated when the waste material is sold to the disposer party with the disposer party purchasing the waste material (meaning that the entity disposing the waste is due a credit).

Delivery and shipment documents 204 are transportation orders that can be used to arrange transportation of the waste material described by a waste disposal order 218 to the disposer party. Example delivery and shipment documents 204 include a waste delivery document 230. For example, the waste disposal delivery document 230 may describe the waste material including, for example, any packing material to be used. The waste disposal delivery document 230 may be generated, for example, by an outbound delivery workflow implemented by one of the applications 112, 114, 116, 118 of the order-to-cash process 104.

The waste delivery document 230, in some examples, prompts the creation of a waste disposal shipment document 228. The waste disposal shipment document 228 is generated to initiate shipment of waste material to the disposer party, for example, through the order-to-cash process 104. For example, the order-to-cash process 104 may generate the waste disposal shipment document 228 using a shipment document workflow implemented by one or more of the applications 112, 114, 116, 118.

The waste disposal delivery document 230, in some examples, is used to arrange transportation of the waste material described by the waste disposal order 218. In some examples, the waste disposal delivery document 230 includes a transport manifest 217 describing the shipping or transport of the waste material. For example, the transport manifest 217 may include a description of the waste material, a description of the transportation service used to deliver the waste material to the disposer party, and so forth. The transport manifest 217, in some examples, includes data regarding the shipping or transport of the waste material that is provided to the regulatory agency or agencies as described herein. In some examples, the order-to-cash process 104 generates the transport manifest 217 using data retrieved from the waste disposal delivery document 230.

Transport management documents 206 include transportation orders that may be generated by the transportation process 108. For example, in addition to or instead of using the order-to-cash process 104 to generate delivery and shipment documents 204, the order-to-cash process 104 may call the transportation process 108 to arrange for transportation of the waste material to the disposer party. For example, the order-to-cash process 104 may generate the waste disposal delivery document 230, which may trigger the transportation management process 108. The transportation process 108 may generate a waste disposal freight order 232 describing the desired transportation including, for example, the waste material to be transported, packing materials for the transport, and so forth. The waste disposal freight order 232 may be generated, for example, using a shipment workflow executed by one or more of the applications 128, 130, 132, 134 of the transportation process 108.

The transportation process 108 (e.g., an application 128, 130, 132, 134 thereof) may post a freight settlement document 234 from the freight order 232. In some examples, the transportation process 108 prompts the procure-to-pay process 106 to generate a corresponding purchase order 238 with a service entry sheet 240. In some examples, a freight settlement workflow of the transportation service 108 and/or the procure-to-pay process 106 generates transporter invoiced settlement documents 210. When an invoice from the transportation service is received (via a finance workflow 212), the invoice, at 242, may be evaluated and settled against the purchase order 238.

Disposal billing documents 208 may be generated and processed, for example, by the order-to-cash process 104 to handle payments associated with the waste disposal. For example, if the waste material is to be purchased by the waste receiver, a sales invoice workflow implemented by one or more of the applications 112, 114, 116, 118 of the order-to-cash process generates a waste disposal invoice 235. The waste disposal invoice 235 may be provided to the disposer party for payment. For example, the waste disposal invoice 235 may be provided to a finance workflow 212 for processing against incoming payments. If the disposer party is to be compensated for receiving the waste material, a waste disposal credit memo 236 may be generated, for example, by a credit memo request workflow of the order-to-cash process 104, where the credit memo request workflow is implemented by one or more of the applications 112, 114, 116, 118. The waste disposal credit memo 236 may be provided to the finance workflow 212 for initiating a payment or other credit to the disposer party.

Figure 3:
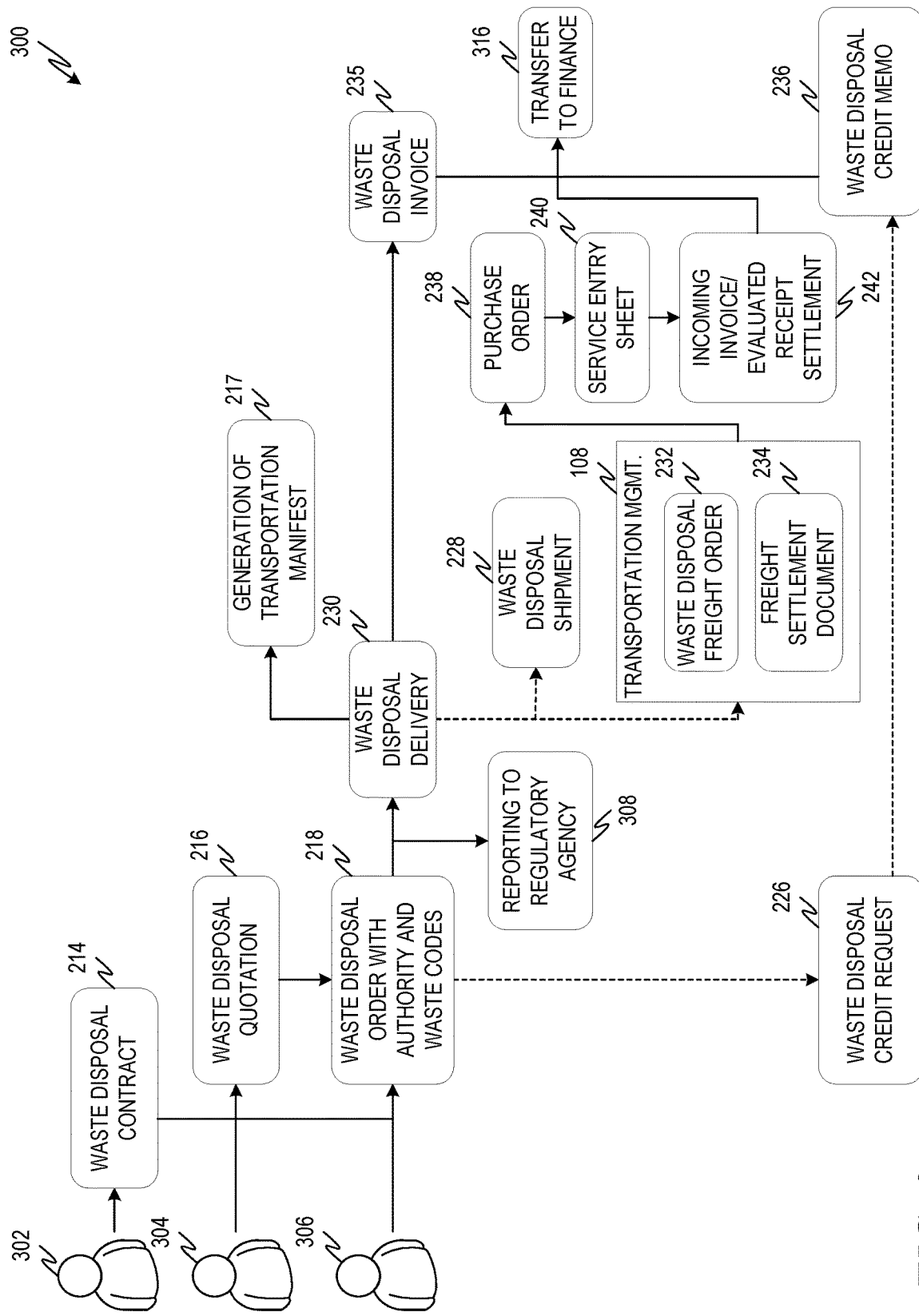
FIG. 3 is a multi-path workflow that shows example techniques for processing a waste disposal transaction utilizing the ERP client processes of FIG. 1.

FIG. 3 is a multi-path workflow 300 that shows example techniques for processing a waste disposal transaction utilizing the ERP processes 104, 106, 108 of FIG. 1. In some examples, a waste disposal transaction begins when a user 302 prompts the order-to-pay process 104 (e.g., a sales contract workflow thereof) to generate the waste disposal contract 214. In some examples, the waste disposal contract 214 is generated using a sales contract workflow or similar workflow implemented by an application 112, 114, 116, 118 of the order-to-cash process 104. The waste disposal contract 214 may be generated for the quantity of waste material being disposed. In transactions where the disposer party purchases the waste material, the waste disposal contract 214 may indicate the purchase price as with other sales contracts. In transactions where the disposer party charges a fee to remove the waste material, the waste disposal contract 214 may also indicate the fee charged by the disposer party for receiving the waste material by providing a negative price in the waste disposal contract 214.

In addition to or instead of beginning with a waste disposal contract 214, the order-to-cash process 104 may execute a sales quotation workflow to generate the waste disposal quotation 216. In some examples, generating the waste disposal quotation 216 is performed in response to a prompt from a user 304. The user 304, in some examples, is the same user 302 that initiated the waste disposal contract 214 or a different user.

Generating the waste disposal quotation 216 may include communicating with one or more disposer parties to provide prices that the party disposing the waste material would either pay or charge to remove the waste material. The waste disposal quotation 216 may be generated for an entry of waste material and a quantity of waste material. In some examples, a waste disposal quotation 216 is generated from a waste disposal contract 214. If the waste disposal quotation 216 is generated from the waste disposal contract 214, the price for the waste disposal quotation 216 may be populated from the waste disposal contract 214. In some examples, the user 304 may override the price from the waste disposal contract 214.

In some examples, the waste disposal quotation 216 is generated without an associated waste disposal contract 214. Accordingly, the price for the waste disposal quotation 216 may be determined based on the whether the waste material is being sold (e.g., the disposer party pays to remove the waste) or disposed. If the waste material is being disposed, the price of the waste may negative or may be indicated to be zero with an additional line item added to the waste disposal quotation 216 indicating a negative price.

A user 306 may prompt creation of the waste disposal order 218. In some examples, generation of the waste disposal order 218 is prompted automatically, for example, when a record of the waste material is provided. The user 306 may be the same user 302 that initiated the waste disposal contract, the same user 304 that initiated the waste disposal quotation 216, and/or a different user. The waste disposal order 218 may be generated from a waste disposal quotation 216 and/or from a waste disposal contract 214.

The waste disposal order 218 may be generated using a sales order workflow of the order-to-cash process 104. The waste disposal order 218 may be arranged to permit a negative price, a material description field 222 including a waste code describing the waste material, a regulatory agency field 220 for indicating an agency to which the waste disposal is to be reported, and an output field 224 describing a reporting action to the agency using the waste code. Some or all of the fields of the waste disposal order 218 may be populated from the waste disposal quotation 216 and/or the waste disposal contract 214.

The waste disposal order 218 may trigger reporting of the waste disposal to the regulatory agency at operation 308. The waste disposal order 218 may be used to generate the report. For example, the order-to-cash process 104 may generate a reporting document indicating the quantity of waste material and the waste code indicating the type of waste material. In some examples, other data from the waste disposal order may also be part of the report. The report may be provided to the regulatory agency indicated by the waste disposal order 218, for example, at a universal resource locator (URL) or other address indicated by the waste disposal order 218. In some examples, the report is provided to the regulatory agency via an electronic transfer, and/or by printing and providing a paper copy of the report.

The order-to-cash process 104 also generates an optional waste disposal credit request 226. The waste disposal credit request 226 may be created, for example, when a disposal fee is being paid to the disposal party. For example, the order-to-cash process 104 may generate the waste disposal credit request 226 when a price to the disposer party is indicated as a separate negative line item on the waste disposal order 218. The waste disposal credit request 226 may price the waste materials to a credit disposal fee owed to the disposer party.

The order-to-cash process 104 may handle delivery of the waste material to the disposer party by directly and/or may prompt generating delivery and shipment documents 204 and/or may pass off delivery to the transportation process 108. In examples in which the order-to-cash process 104 handles transportation directly, it may generate a waste disposal delivery document 230, for example, using an outbound delivery workflow. For example, the order-to-cash process 104 may generate the transportation manifest 217. The transportation manifest 217 may be stored to provide a record of the shipment of the waste material. In some examples, a bill of lading may be generated in instead of or in addition to the transportation manifest 217.

The order-to-cash process 104 may also create a waste disposal shipment document 228 from the waste disposal delivery document 230, for example, to initiate shipment of the waste material to the disposer party. Generating the waste disposal shipment document 228 may include generating a shipment cost, for example, using a condition record based on the quantity or volume of the waste material to be transported. In some examples, the waste disposal document comprises a "transfer automatically" flag that can be set manually by a user 306, 304, 302 and/or set automatically based on stored settings. When the "transfer automatically" flag is set, the order-to-cash process 104 may automatically create a purchase order to cover the cost of the transportation. If the "transfer automatically" flag is not set, a purchase order may be generated based on instructions from a user 302, 304, 306.

In some examples, instead of generating the waste disposal shipment document 228 and transportation manifest 217, the order-to-cash process 104 may utilize the transportation process 108 to arrange for transportation of the waste material. For example, the order-to-cash process 104 may generate the waste disposal delivery document 230 to prompt the transportation process 108 and provide an indication of the disposer party and information about the waste material such as, for example, its quantity, its location, packing material and instructions, etc. Data provided to the transportation process 108, in some examples, is included in the waste disposal delivery document 230.

The transportation process 108 may generate the waste disposal freight order 232, for example, using a shipment workflow. The waste disposal freight order 232 may prompt transportation of the waste material to the disposer party, for example, by prompting a delivery by the entity generating the waste and/or by prompting the hiring of an outside transportation service to transport the waste material. The transportation process 108 may also generate a freight settlement document 234 from the freight order, where the freight settlement document 234 describes a payment to a carrier that will transport the waste material to the disposer party.

The transportation process 108 (e.g., an application 128, 130, 132, 134 thereof) may post the freight settlement document 234 and generate the corresponding purchase order 238 and service entry sheet 240 using a freight settlement workflow implemented by one or more of the applications 128, 130, 132, 134. When an invoice from the transporter is received (via a finance workflow 212), the invoice, at 242, may be evaluated and settled against the purchase order 238. For example, the purchase order 238 may be transferred to a financial client process at operation 316 for matching incoming invoices with the purchase order 238.

In examples in which the disposer party purchases the waste material, the order-to-cash process 104 generates the waste disposal invoice 235, which may be provided to the disposer party for payment. The invoice 235 may be posted to the finance process at operation 316 to be provided to the disposer party for payment.

In examples in which a credit request 226 is generated, the order-to-cash process 104 may generate the waste disposal credit memo 236 indicating the price to be paid to the disposer party. The credit memo 236 may be provided to the finance process to initiate payment to the disposer party, for example, upon receipt of an invoice from the disposer party.

Figure 4:
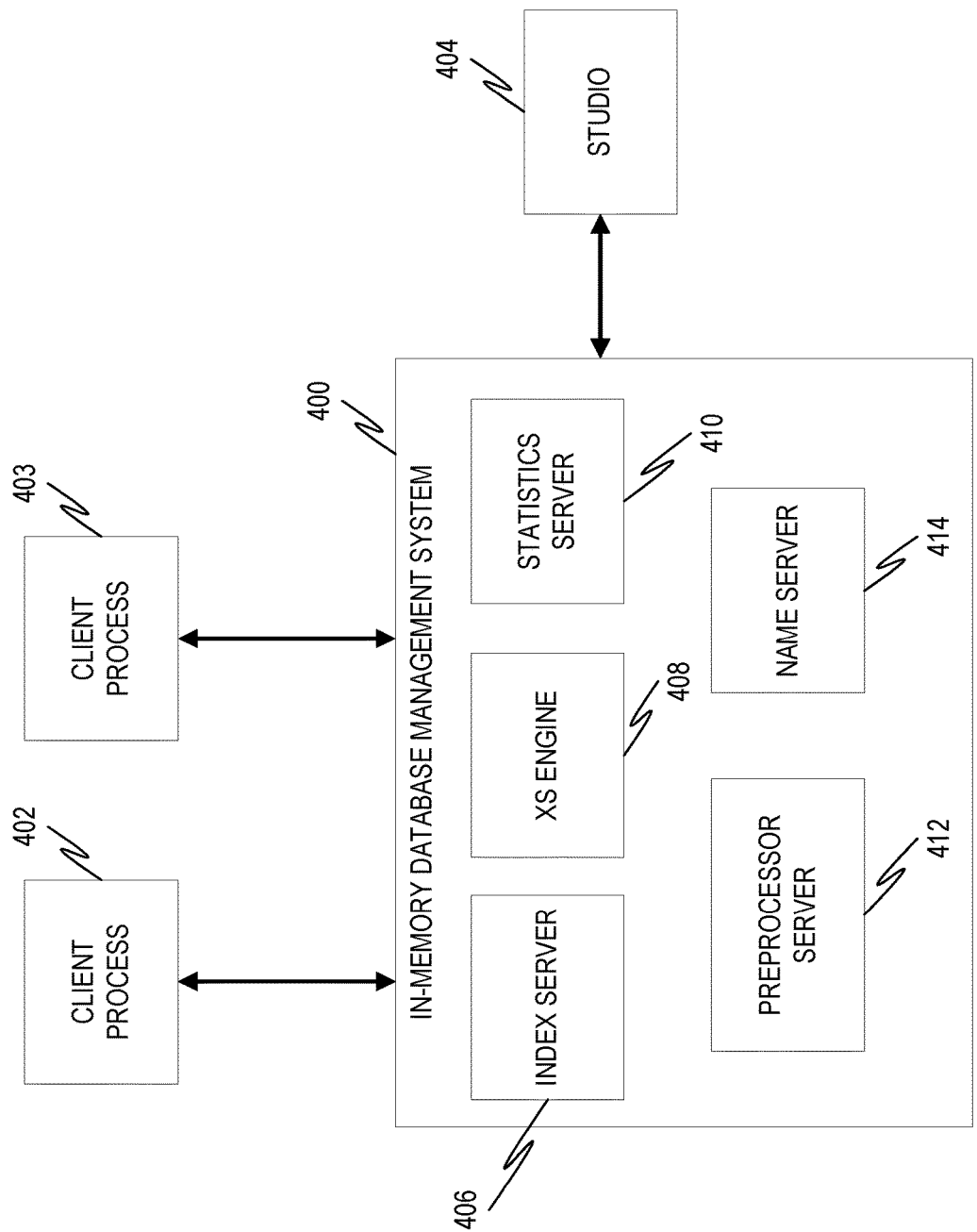
FIG. 4 is a diagram illustrating an example of in-memory database management system that may be used to implement table privilege management, for example, as described herein.
Figure 5:
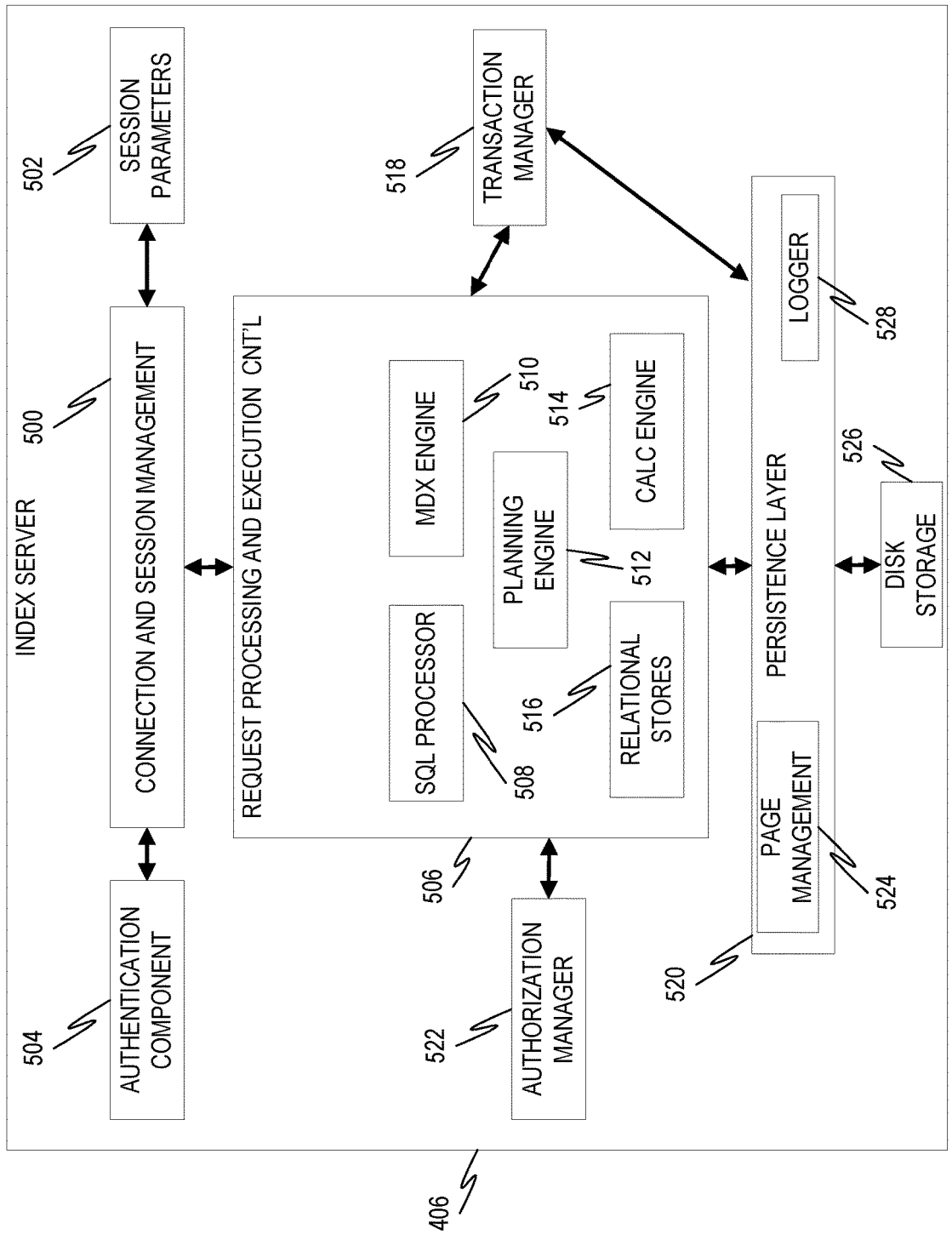
FIG. 5 is a diagram illustrating an example of an index server of the in-memory database management system of FIG. 4.
Figure 6:
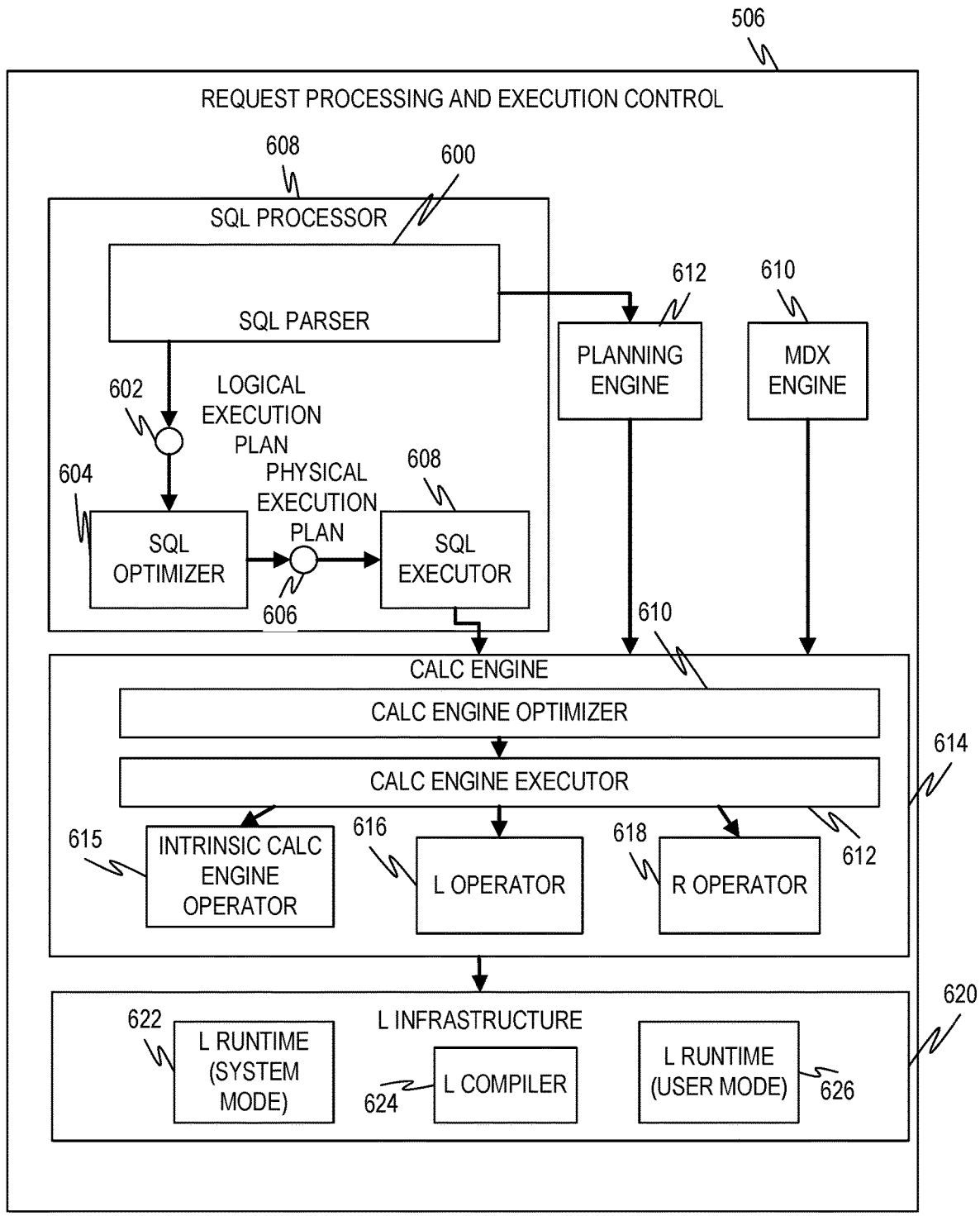
FIG. 6 is a diagram illustrating one example of the request processing and execution control of the database management system of FIG. 4.

FIGS. 4-6 provide examples of the operation of an in-memory DBMS 400 and an associated suite of client processes 402, 403. For example, the DBMS 400 is one example way to implement the DBMS 102 of FIG. 1 and the client processes 402, 403.

FIG. 4 is a diagram illustrating an example of an in-memory DBMS 400. An in-memory database stores data primarily at main memory, such as a random access memory. This is different than databases that primarily employ a disk storage mechanism. In some examples, the DBMS 400 may be or include an example of the HANA™ system from SAP SE of Walldorf, Germany. Although various features of the waste disposal process described herein may be performed in the context of an in-memory database, other databases and DBMSs may be used as well.

The in-memory DBMS 400 can be used to implement various components described herein. In some examples, the in-memory DBMS 400 can be optimized for operation with an ERP solution comprising, for example, an order-to-cash process 104, a procure-to-pay process 106, and/or a transportation process 108 as described herein.

The in-memory DBMS 400 may be coupled to one or more client processes 402, 403. Client processes 402, 403 may perform operations similar to those of the client processes 104, 106, 108 of FIG. 1. For example, the client processes 402, 403 may be used to implement an ERP suite and to utilize workflows of the order-to-cash process 104 and procure-to-pay process 106 to implement a waste disposal transaction as described herein. The client processes 402, 403 may communicate with the in-memory DBMS 400 through a number of different protocols, including Structured Query Language (SQL), Multidimensional Expressions (MDX), Hypertext Transfer Protocol (HTTP), Representational State Transfer (REST), Hypertext Markup Language (HTML). For example, the various documents and data structures described herein with respect to FIGS. 3 and 4 may be stored and managed by the DBMS 400.

FIG. 4 also shows a studio 404 that may be used to perform modeling by accessing the in-memory DBMS 400. In some examples, the studio 404 may allow complex analysis to be performed on data drawn not only from real time event data and windows, but also from stored database information.

The in-memory DBMS 400 may comprise a number of different components, including an index server 406, an XS engine 408, a statistics server 410, a preprocessor server 412, and a name server 414. These components may operate on a single computing device or may be spread among multiple computing devices (e.g., separate servers). The index server 406 contains the actual data and the engines for processing the data. It may also coordinate and uses the other servers.

The XS engine 408 allows clients to connect to the in-memory DBMS 400 using web protocols, such as HTTP. Although the XS engine 408 is illustrated as a component of the in-memory DBMS 400, in some examples, the XS engine may be implemented as one or more Application Program Interfaces (APIs) and/or services positioned between the client processes 402, 403 and the in-memory DBMS 400. In some examples, the XS engine 408 may handle client requests received in languages other than SQL such as, for example, MDX, HTTP, REST, HTML, and so forth.

The statistics server 410 collects information about status, performance, and resource consumption from all the other server components. The statistics server 410 can be accessed from the studio 404 to obtain the status of various alert monitors.

The preprocessor server 412 is used for analyzing text data and extracting the information on which the text search capabilities are based.

The name server 414 holds information about the database topology. This is used in a distributed system with instances of the database on different hosts. The name server 414 knows where the components are running and which data is located on which server. In an example embodiment, a separate enqueue server may operate in the manner described above with respect to enqueue servers, specifically with regard to creating and managing light-weight enqueue sessions.

FIG. 5 is a diagram illustrating an example of the index server 406. Specifically, the index server 406 of FIG. 4 is depicted in more detail. The index server 406 includes a connection and session management component 500, which is responsible for creating and managing sessions and connections for the database clients (e.g. client processes 402, 403). Once a session is established, clients can communicate with the database system using SQL statements. For each session, a set of session parameters 502 may be maintained, such as auto-commit, current transaction isolation level, and so forth. Users (e.g., system administrators, developers) may be authenticated by the database system itself (e.g., by logging in with log-in information such as a username and password, using an authentication component 504) or authentication can be delegated to an external authentication provider such as a Lightweight Directory Access Protocol (LDAP) directory.

Client requests, such as contract form requests, can be analyzed and executed by a set of components summarized as request processing and execution control 506. An SQL processor 508 checks the syntax and semantics of the client SQL statements and generates a logical execution plan. MDX is a language for querying and manipulating multidimensional data stored in Online Analytical Processing (OLAP) cubes. As such, an MDX engine 510 may be provided to allow for the parsing and executing of MDX commands. A planning engine 512 allows applications to execute basic planning operations in the database layer. One such operation is to create a new version of a dataset as a copy of an existing dataset, while applying filters and transformations.

A calculation engine 514 implements the various SQL script and planning operations. The calculation engine 514 creates a logical execution plan for calculation models derived from SQL script, MDX, planning, and domain-specific models. This logical execution plan may include, for example, breaking up a model into operations that can be processed in parallel. The data is stored in relational stores 516, which implement a relational database in main memory. Each SQL statement may be processed in the context of a transaction. New sessions are implicitly assigned to a new transaction. A transaction manager 518 coordinates database transactions, controls transactional isolation, and keeps track of running and closed transactions. When a transaction is committed or rolled back, the transaction manager 518 informs the involved engines about this event so they can execute needed actions. The transaction manager 518 also cooperates with a persistence layer 520 to achieve atomic and durable transactions.

An authorization manager 522 is invoked by other database system components to check whether the user has the specified privileges to execute the requested operations. The database system allows for the granting of privileges to users or roles. A privilege grants the right to perform a specified operation on a specified object.

The persistence layer 520 ensures that the database is restored to the most recent committed state after a restart and that transactions are either completely executed or completely undone. To achieve this goal in an efficient way, the persistence layer 520 uses a combination of write-ahead logs, shadow paging, and save points. The persistence layer 520 also offers a page management interface 524 for writing and reading data to a separate disk storage 526 and also contains a logger 528 that manages the transaction log. Log entries can be written implicitly by the persistence layer 520 when data is written via the persistence interface or explicitly by using a log interface.

FIG. 6 is a diagram illustrating one example of the request processing and execution control 506. This diagram depicts the request processing and execution control 506 of FIG. 5 in more detail. The SQL processor 608 contains an SQL parser 600, which parses the SQL statement and generates a logical execution plan 602, which it passes to an SQL optimizer 604. The SQL optimizer 604 optimizes the logical execution plan 602 and converts it to a physical execution plan 606, which it then passes to a SQL executor 608. The calculation engine 614 implements the various SQL script and planning operations, and includes a calc engine optimizer 610, which optimizes the operations, and a calc engine executor 612, which executes the operations. The calculation engine 614 also includes an intrinsic calc engine operator 615, an L operator 616, and an R operator 618.

An L infrastructure 620 includes a number of components to aid in the running of L procedures, including an L-runtime (system mode) 622, an L compiler 624, and an L-runtime (User mode) 626.

Examples

Example 1 is a computer-implemented system for executing an enterprise resource planning solution using a database management system (DBMS), the system comprising: at least one processor programmed to perform operations comprising: accessing, by an order-to-cash process executing at the at least one processor, an indication of waste material for disposal, the order-to-cash process comprising at least one of order-to-cash applications in communication with a DBMS also executing at the at least one processor; generating, by a first order-to-cash application of the at least one order-to-cash application, a waste disposal order, the waste disposal order comprising: a material description field including a description of the waste material, regulatory reporting data describing at least one report of the waste material to be provided to a regulatory agency, and a price field indicating a negative price; generating, by the first order-to-cash application, a transportation order for transporting the waste material to a disposer party; generating, by a second order-to-cash application of the at least one order-to-cash application, a credit memo document describing a credit owed for the waste disposal; and initiating, by a third order-to-cash application of the at least one order-to-cash application, a payment to the disposer party based on the credit memo.

In Example 2, the subject matter of Example 1 optionally includes the regulatory reporting data comprising a description of the regulatory agency and a waste code describing the waste materials, the operations further comprising communicating, by a third order-to-cash application, a description of the waste material to a regulatory agency computing system associated with the regulatory agency.

In Example 3, the subject matter of any one or more of Examples 1-2 optionally includes the regulatory reporting data comprising reading from the waste disposal order an address associated with the regulatory agency, the communicating the description of the waste material comprising communicating the description of the waste material to the address associated with the regulatory agency.

In Example 4, the subject matter of any one or more of Examples 1-3 optionally includes the generating of the waste disposal order comprising: accessing, by the first order-to-cash application and from the DBMS, a waste disposal quotation document stored at the DBMS, the waste disposal quotation document describing a quantity of the waste material, an indication of the disposer party, and an indication of the negative price.

In Example 5, the subject matter of any one or more of Examples 1-4 optionally includes the operations further comprising: generating, by a procure-to-pay process executing at the at least one processor, a purchase order for a transportation service to transport the waste material.

In Example 6, the subject matter of Example 5 optionally includes the operations further comprising generating, by a first transportation application of a transportation process executing at the at least one processor, a transportation invoice describing a payment for the transportation service to transport the waste material.

In Example 7, the subject matter of any one or more of Examples 1-6 optionally includes the operations further comprising: generating a transport manifest document describing the transporting of the waste material to a disposer party; and storing the transport manifest using the DBMS.

In Example 8, the subject matter of any one or more of Examples 1-7 optionally includes the operations further comprising: querying the DBMS to retrieve a business partner record describing the disposer party; and writing data from the business partner record to the waste disposal order.

Example 9 is a software-implemented method for executing an enterprise resource planning solution, the method comprising: accessing, by an order-to-cash process, an indication of waste material for disposal, the order-to-cash process comprising at least one of order-to-cash applications in communication with a database management system (DBMS); generating, by a first order-to-cash application of the at least one order-to-cash application, a waste disposal order, the waste disposal order comprising: a material description field including a description of the waste material, regulatory reporting data describing at least one report of the waste material to be provided to a regulatory agency, and a price field indicating a negative price; generating, by the first order-to-cash application, a transportation order for transporting the waste material to a disposer party; generating, by a second order-to-cash application of the at least one order-to-cash application, a credit memo document describing a credit owed for the waste disposal; initiating, by a third order-to-cash application of the at least one order-to-cash application, a payment to the disposer party based on the credit memo.

In Example 10, the subject matter of Example 9 optionally includes the regulatory reporting data comprising a description of the regulatory agency and a waste code describing the waste materials, the method further comprising communicating, by a third order-to-cash application, a description of the waste material to a regulatory agency computing system associated with the regulatory agency.

In Example 11, the subject matter of any one or more of Examples 9-10 optionally includes the regulatory reporting data comprising reading from the waste disposal order an address associated with the regulatory agency, the communicating the description of the waste material comprising communicating the description of the waste material to the address associated with the regulatory agency.

In Example 12, the subject matter of any one or more of Examples 9-11 optionally includes the generating of the waste disposal order comprising: accessing, by the first order-to-cash application and from the DBMS, a waste disposal quotation document stored at the DBMS, the waste disposal quotation document describing a quantity of the waste material, an indication of the disposer party, and an indication of the negative price.

In Example 13, the subject matter of any one or more of Examples 9-12 optionally includes generating, by a procure-to-pay process executing at the at least one processor, a purchase order for a transportation service to transport the waste material.

In Example 14, the subject matter of Example 13 optionally includes generating, by a first transportation application of a transportation process executing at the at least one processor, a transportation invoice describing a payment for the transportation service to transport the waste material.

In Example 15, the subject matter of any one or more of Examples 9-14 optionally includes generating a transport manifest document describing the transporting of the waste material to a disposer party; and storing the transport manifest using the DBMS.

In Example 16, the subject matter of any one or more of Examples 9-15 optionally includes querying the DBMS to retrieve a business partner record describing the disposer party; and writing data from the business partner record to the waste disposal order.

Example 17 is a non-transitory machine-readable medium comprising instructions thereon that, when executed at least one processor, causes the at least one processor to perform operations comprising: accessing, by an order-to-cash process executing at the at least one processor, an indication of waste material for disposal, the order-to-cash process comprising at least one of order-to-cash applications in communication with a database management system (DBMS) executing at the at least one processor; generating, by a first order-to-cash application of the at least one order-to-cash application, a waste disposal order, the waste disposal order comprising: a material description field including a description of the waste material, regulatory reporting data describing at least one report of the waste material to be provided to a regulatory agency, and a price field indicating a negative price; generating, by the first order-to-cash application, a transportation order for transporting the waste material to a disposer party; generating, by a second order-to-cash application of the at least one order-to-cash application, a credit memo document describing a credit owed for the waste disposal; initiating, by a third order-to-cash application of the at least one order-to-cash application, a payment to the disposer party based on the credit memo.

In Example 18, the subject matter of Example 17 optionally includes the regulatory reporting data comprising a description of the regulatory agency and a waste code describing the waste materials, the operations further comprising communicating, by a third order-to-cash application, a description of the waste material to a regulatory agency computing system associated with the regulatory agency.

In Example 19, the subject matter of any one or more of Examples 17-18 optionally includes the regulatory reporting data comprising reading from the waste disposal order an address associated with the regulatory agency, the communicating the description of the waste material comprising communicating the description of the waste material to the address associated with the regulatory agency.

In Example 20, the subject matter of any one or more of Examples 17-19 optionally includes the generating of the waste disposal order comprising: accessing, by the first order-to-cash application and from the DBMS, a waste disposal quotation document stored at the DBMS, the waste disposal quotation document describing a quantity of the waste material, an indication of the disposer party, and an indication of the negative price.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Figure 7:
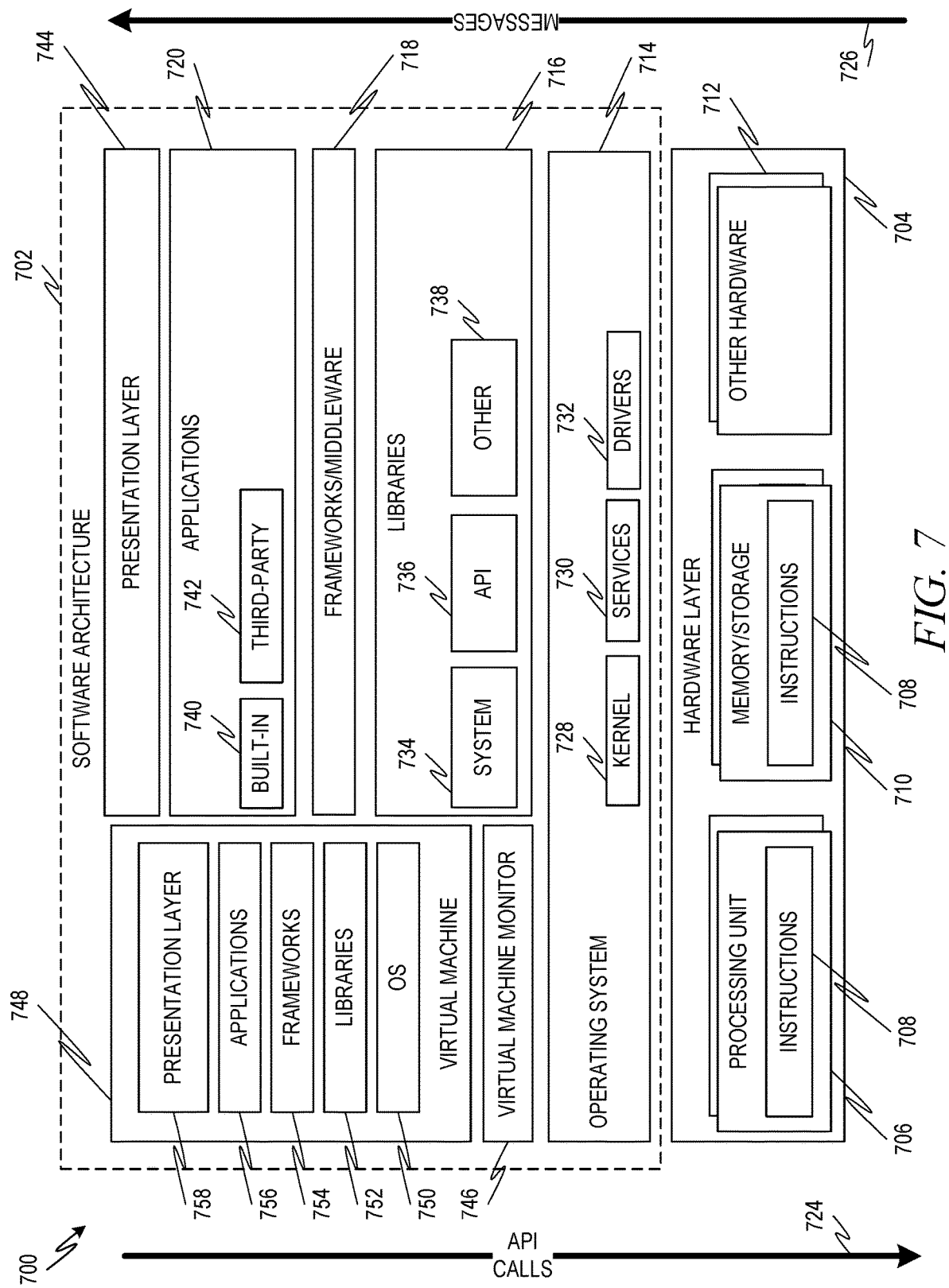
FIG. 7 is a block diagram showing one example of a software architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 7.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 7D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), and frameworks/middleware 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756, and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
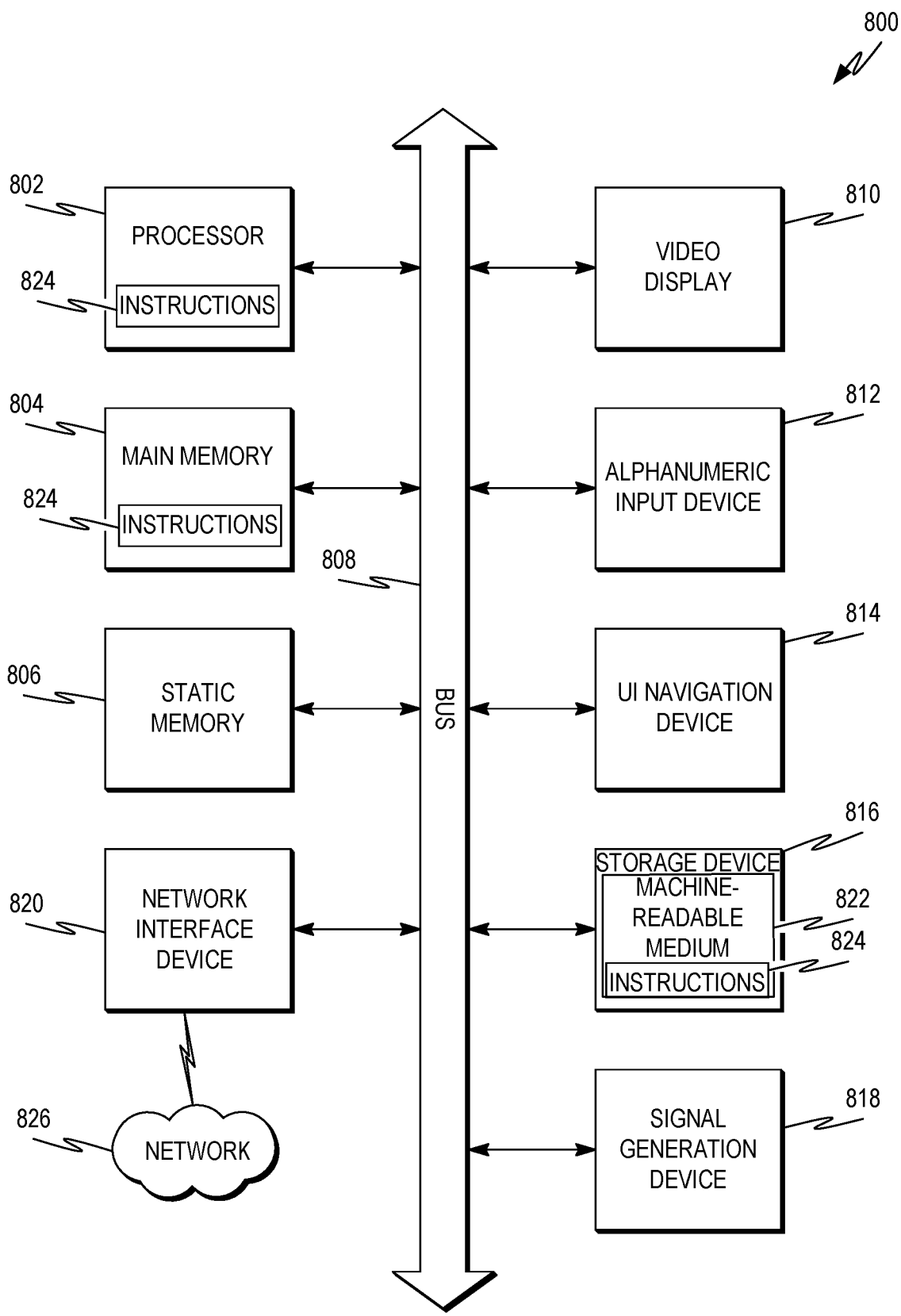
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented system for executing an enterprise resource planning (ERP) software package using a database management system (DBMS), the system comprising:
   at least one processor programmed to perform operations comprising:
   accessing, by an order-to-cash process of the ERP software package, an indication of waste material for disposal, the order-to-cash process executing at the at least one processor and comprising at least one order-to-cash application in communication with a DBMS also executing at the at least one processor;
   generating, by a first order-to-cash application of the at least one order-to-cash application, a waste disposal order document, the waste disposal order document comprising: a material description field including a description of the waste material, regulatory reporting data describing at least one report of the waste material to be provided to a regulatory agency, and a price field indicating a negative price, the waste disposal order document being described by a waste disposal document type record stored at a document type record table of the DBMS;
   electronically communicating, by the order-to-cash process, the description of the waste material from the waste disposal order document to a regulatory agency computing system associated with the regulatory agency, the communicating being triggered at the order-to-cash process by the generating of the waste disposal order document;
   storing, by the first order-to-cash application, the waste disposal order document at the DBMS;
   generating, by the first order-to-cash application, a transportation order for transporting the waste material to a disposer party; and
   generating, by a second order-to-cash application of the at least one order-to-cash application, a credit memo document describing a credit owed for the waste disposal; and initiating, by a third order-to-cash application of the at least one order-to-cash application, a payment to the disposer party based on the credit memo document.

2. The system of claim 1, the regulatory reporting data comprising a description of the regulatory agency and a waste code describing the waste material, the communicating being executed by a third order-to-cash application of the order-to-cash process.

3. The system of claim 1, the operations further comprising reading, from the waste disposal order document, an address associated with the regulatory agency, the communicating comprising communicating the description of the waste material to the address associated with the regulatory agency.

4. The system of claim 1, the generating of the waste disposal order document comprising:
   accessing, by the first order-to-cash application and from the DBMS, a waste disposal quotation document stored at the DBMS, the waste disposal quotation document describing a quantity of the waste material, an indication of the disposer party, and an indication of the negative price.

5. The system of claim 1, the operations further comprising:
generating, by a procure-to-pay process executing at the at least one processor, a purchase order for a transportation service to transport the waste material.

6. The system of claim 5, the operations further comprising generating, by a first transportation application of a transportation process executing at the at least one processor, a transportation invoice describing a payment for the transportation service to transport the waste material.

7. The system of claim 1, the operations further comprising:
generating a transport manifest document describing the transporting of the waste material to a disposer party; and
storing the transport manifest document using the DBMS.

8. The system of claim 1, the operations further comprising:
querying the DBMS to retrieve a business partner record describing the disposer party; and
writing data from the business partner record to the waste disposal order document.

9. A software-implemented method for executing an enterprise resource planning solution, the method comprising:
accessing, by an order-to-cash process, an indication of waste material for disposal, the order-to-cash process comprising at least one order-to-cash application of an enterprise resource planning (ERP) software package executing at at least one processor and in communication with a database management system (DBMS);
generating, by a first order-to-cash application of the at least one order-to-cash application, a waste disposal order document, the waste disposal order document comprising: a material description field including a description of the waste material, regulatory reporting data describing at least one report of the waste material to be provided to a regulatory agency, and a price field indicating a negative price, the waste disposal order document being described by a waste disposal document type record stored at a document type record table of the DBMS;
electronically communicating, by the order-to-cash process, the description of the waste material from the waste disposal order document to a regulatory agency computing system associated with the regulatory agency, the communicating being triggered at the order-to-cash process by the generating of the waste disposal order document;
storing, by the first order-to-cash application, the waste disposal order document at the DBMS;
generating, by the first order-to-cash application, a transportation order for transporting the waste material to a disposer party;
generating, by a second order-to-cash application of the at least one order-to-cash application, a credit memo document describing a credit owed for the waste disposal; and
initiating, by a third order-to-cash application of the at least one order-to-cash application, a payment to the disposer party based on the credit memo document.

10. The method of claim 9, the regulatory reporting data comprising a description of the regulatory agency and a waste code describing the waste material, the communicating being executed by a third order-to-cash application of the order-to-cash process.

11. The method of claim 9, further comprising reading, from the waste disposal order document, an address associated with the regulatory agency, the communicating comprising communicating the description of the waste material to the address associated with the regulatory agency.

12. The method of claim 9, the generating of the waste disposal order document comprising:
accessing, by the first order-to-cash application and from the DBMS, a waste disposal quotation document stored at the DBMS, the waste disposal quotation document describing a quantity of the waste material, an indication of the disposer party, and an indication of the negative price.

13. The method of claim 9, further comprising:
generating, by a procure-to-pay process executing at the at least one processor, a purchase order for a transportation service to transport the waste material.

14. The method of claim 13, further comprising generating, by a first transportation application of a transportation process executing at the at least one processor, a transportation invoice describing a payment for the transportation service to transport the waste material.

15. The method of claim 9, further comprising:
generating a transport manifest document describing the transporting of the waste material to a disposer party; and
storing the transport manifest document using the DBMS.

16. The method of claim 9, further comprising:
querying the DBMS to retrieve a business partner record describing the disposer party; and
writing data from the business partner record to the waste disposal order document.

17. A non-transitory machine-readable medium comprising instructions thereon that, when executed at least one processor, causes the at least one processor to perform operations comprising:
accessing, by an order-to-cash process of an enterprise resource planning (ERP) software package executing at the at least one processor, an indication of waste material for disposal, the order-to-cash process comprising at least one order-to-cash application in communication with a database management system (DBMS) executing at the at least one processor;
generating, by a first order-to-cash application of the at least one order-to-cash application, a waste disposal order document, the waste disposal order document comprising: a material description field including a description of the waste material, regulatory reporting data describing at least one report of the waste material to be provided to a regulatory agency, and a price field indicating a negative price, the waste disposal order document being described by a waste disposal document type record stored at a document type record table of the DBMS;
electronically communicating, by the order-to-cash process, the description of the waste material from the waste disposal order document to a regulatory agency computing system associated with the regulatory agency, the communicating being triggered at the order-to-cash process by the generating of the waste disposal order document;
storing, by the first order-to-cash application, the waste disposal order document at the DBMS;

generating, by the first order-to-cash application, a transportation order for transporting the waste material to a disposer party;

generating, by a second order-to-cash application of the at least one order-to-cash application, a credit memo document describing a credit owed for the waste disposal; and initiating, by a third order-to-cash application of the at least one order-to-cash application, a payment to the disposer party based on the credit memo document.

18. The non-transitory machine-readable medium of claim 17, the regulatory reporting data comprising a description of the regulatory agency and a waste code describing the waste material, the communicating being executed by a third order-to-cash application of the order-to-cash process.

19. The non-transitory machine-readable medium of claim 17, the operations further comprising reading, from the waste disposal order document, an address associated with the regulatory agency, the communicating comprising communicating the description of the waste material to the address associated with the regulatory agency.

20. The non-transitory machine-readable medium of claim 17, the generating of the waste disposal order document comprising:

accessing, by the first order-to-cash application and from the DBMS, a waste disposal quotation document stored at the DBMS, the waste disposal quotation document describing a quantity of the waste material, an indication of the disposer party, and an indication of the negative price.

\* \* \* \* \*